US012494601B2

(12) United States Patent
Enomoto et al.

(10) Patent No.: US 12,494,601 B2
(45) Date of Patent: Dec. 9, 2025

(54) CONNECTOR

(71) Applicant: Nippon Tanshi Co., Ltd., Hiratsuka (JP)

(72) Inventors: Shinya Enomoto, Kanagawa (JP); Osamu Nishimura, Kanagawa (JP)

(73) Assignee: Nippon Tanshi Co., Ltd., Hiratsuka (JP)

( * ) Notice: Subject to any disclaimer, the term of this patent is extended or adjusted under 35 U.S.C. 154(b) by 345 days.

(21) Appl. No.: 18/042,257

(22) PCT Filed: Aug. 6, 2021

(86) PCT No.: PCT/JP2021/029291
§ 371 (c)(1),
(2) Date: Feb. 20, 2023

(87) PCT Pub. No.: WO2022/039053
PCT Pub. Date: Feb. 24, 2022

(65) Prior Publication Data
US 2023/0307862 A1 Sep. 28, 2023

(30) Foreign Application Priority Data
Aug. 21, 2020 (JP) ................................ 2020-139790

(51) Int. Cl.
*H01R 13/426* (2006.01)
*H01R 13/03* (2006.01)
*H01R 13/428* (2006.01)

(52) U.S. Cl.
CPC ........... *H01R 13/426* (2013.01); *H01R 13/03* (2013.01); *H01R 13/428* (2013.01)

(58) Field of Classification Search
None
See application file for complete search history.

(56) References Cited

U.S. PATENT DOCUMENTS 5,213,514 A * 5/1993 Arai ..................... H01R 12/727 439/82
6,089,928 A 7/2000 Miwa et al.
(Continued)

FOREIGN PATENT DOCUMENTS

CN 202855982 U 4/2013
JP H11283688 A 10/1999
(Continued)

OTHER PUBLICATIONS

International Search Report for Application No. PCT/JP2021/029291 mailed on Oct. 12, 2021, 4 pages.
(Continued)

*Primary Examiner* — Ross N Gushi
(74) *Attorney, Agent, or Firm* — Dority & Manning, P.A.

(57) ABSTRACT

A connector includes a housing defining a terminal holding chamber extending in a prescribed direction, a terminal member inserted to the terminal holding chamber along a prescribed insertion direction, and a retainer attached to the housing by being inserted to the housing along a direction perpendicular to the insertion direction so as to engage with a locking portion of the terminal member and thereby prevent the terminal member from coming off, wherein the terminal member is a bent article made of a plate material including a protruding portion having a top portion on one side in the direction along which the retainer is inserted to the housing, and the protruding portion has an end surface facing in the insertion direction of the terminal member and constituting the locking portion.

3 Claims, 22 Drawing Sheets

(56) References Cited

U.S. PATENT DOCUMENTS

| | | | | |
|---|---|---|---|---|
| 7,976,351 | B2 * | 7/2011 | Boemmel | H01R 13/432 439/748 |
| 8,662,935 | B2 | 3/2014 | Jouas et al. | |
| 11,848,519 | B2 * | 12/2023 | Miyamura | H01R 13/6335 |
| 2003/0045180 | A1 | 3/2003 | Kobayashi et al. | |
| 2008/0119091 | A1 | 5/2008 | Nishide | |
| 2009/0117773 | A1 | 5/2009 | Shimizu | |
| 2019/0334265 | A1 | 10/2019 | Ito | |
| 2020/0083632 | A1 | 3/2020 | Chiba | |

FOREIGN PATENT DOCUMENTS

| | | | |
|---|---|---|---|
| JP | 2002270272 | A | 9/2002 |
| JP | 2009117112 | A | 5/2009 |
| JP | 2009117244 | A | 5/2009 |
| JP | 2013-109893 | A | 6/2013 |
| JP | 2020-024866 | A | 2/2020 |

OTHER PUBLICATIONS

Japanese Office Action (w/English translation) for Corresponding Application No. JP 2022-543883, dated Feb. 4, 2025, 6 pages.

Chinese Office Action (w/machine translation) for corresponding Application No. 202180068710.6, dated Aug. 14, 2025, 14 pages.

* cited by examiner

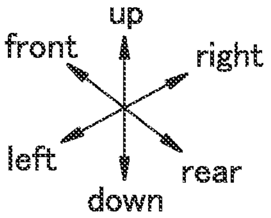
Fig.14
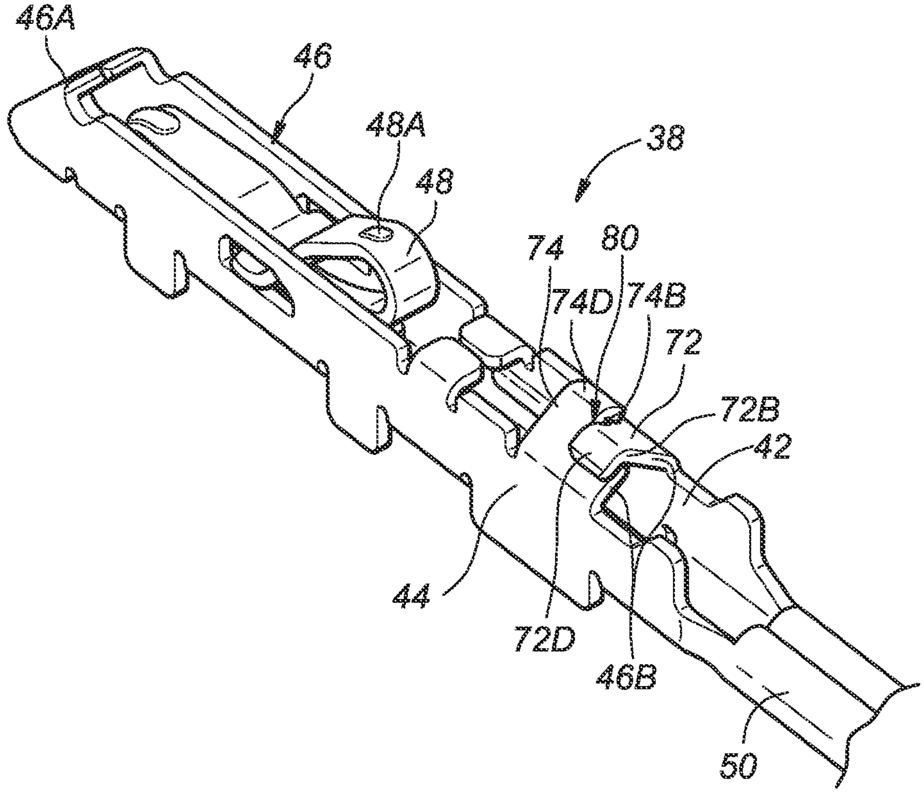

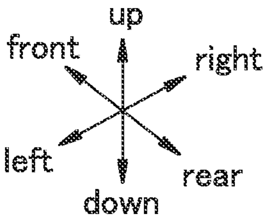
Fig.20
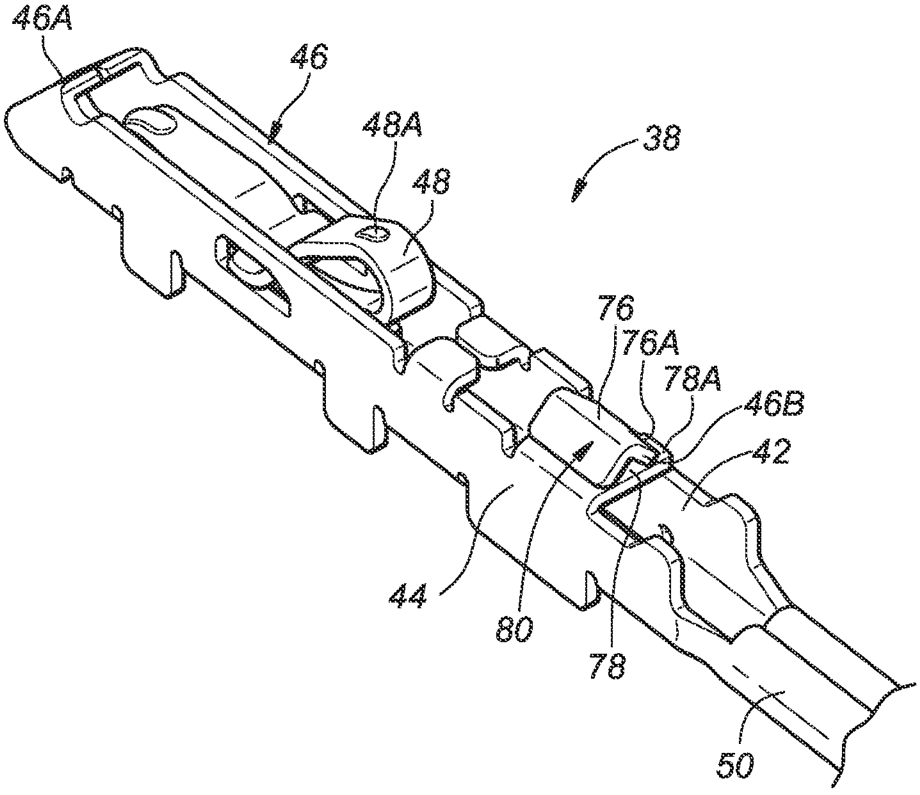

CONNECTOR

CROSS REFERENCE TO RELATED APPLICATIONS

This application is the U.S. National Stage entry of International Application No. PCT/JP2021/029291, filed on Aug. 6, 2021, which, in turn, claims priority to Japanese Patent Application No. 2020-139790, filed on Aug. 21, 2020, both of which are hereby incorporated herein by reference in their entireties for all purposes.

TECHNICAL FIELD

The present invention relates to a connector, and more particularly, to a connector for electrical connection.

BACKGROUND ART

As a connector for electrical connection, there is a connector including an electrically insulated housing having a terminal holding chamber extending in a front-and-rear direction, a conductive terminal member inserted to the terminal holding chamber, and a retainer attached to the housing (for example, Patent Documents 1 to 3).

The retainer is inserted to the housing along a direction (up-and-down direction) perpendicular to one direction. Accordingly, a retainer side end surface facing in the front-and-rear direction is opposed to a terminal side end surface provided on the terminal member, thereby preventing the terminal member from coming off the terminal holding chamber.

PRIOR ART DOCUMENT(S)

Patent Document(s)

Patent Document 1: WO2018/207651
Patent Document 2: JP2019-192613A
Patent Document 3: JP2020-24866A

SUMMARY OF THE INVENTION

Task to be Accomplished by the Invention

In a state where the terminal member is not inserted in a prescribed position of the terminal holding chamber in the front-and-rear direction, that is, in an assembly failure state of the terminal member, the retainer may move onto the terminal member before the retainer is attached to the housing. If the retainer is pushed with a strong force in such a state, a portion of the terminal member onto which the retainer moves may be deformed, and the retainer may be attached to the housing even in the assembly failure state of the terminal member.

An object of the present invention is to provide a connector that prevents a retainer from being attached to a housing in an assembly failure state of a terminal member, thereby reducing the occurrence of defective products.

Means to Accomplish the Task

One embodiment of the present invention provides a connector (10), comprising: a housing (22) defining a terminal holding chamber (34) extending in a prescribed direction; a terminal member (38) inserted to the terminal holding chamber along a prescribed insertion direction (A); and a retainer (62) attached to the housing by being inserted to the housing along a direction (B) perpendicular to the insertion direction so as to engage with a locking portion (46B) of the terminal member and thereby prevent the terminal member from coming off, wherein the terminal member includes a protruding portion (80) having a top portion on one side in the direction along which the retainer is inserted to the housing, and the protruding portion has an end surface facing in the insertion direction of the terminal member and constituting the locking portion.

According to this configuration, the buckling strength of the protruding portion that constitutes the locking portion is increased with respect to an insertion direction of the retainer. Accordingly, the retainer is prevented from being attached to the housing in an assembly failure state of the terminal member, thereby reducing the occurrence of defective products.

In the above connector, preferably, the terminal member is a bent article made of a plate material.

According to this configuration, the terminal member including the protruding portion can be manufactured easily.

In the above connector, preferably, the terminal member includes: a first sidewall (42) and a second sidewall (44) arranged on both lateral sides; a first extending piece (72) inclined from the first sidewall to the second sidewall; and a second extending piece (74) inclined from the second sidewall to the first sidewall, and free end sides of the first extending piece and the second extending piece are offset from each other with respect to the insertion direction of the terminal member and support each other, and thereby the first extending piece and the second extending piece constitute the protruding portion.

According to this configuration, it is possible to constitute the protruding portion with a high buckling strength in the insertion direction of the retainer, so that the retainer is prevented from being attached to the housing in the assembly failure state of the terminal member.

In the above connector, preferably, the free end side of the first extending piece is bent so as to extend along the second extending piece, and overlaps with the second extending piece, and the free end side of the second extending piece is bent so as to extend along the first extending piece, and overlaps with the first extending piece.

According to this configuration, the buckling strength of the protruding portion is further increased with respect to the insertion direction of the retainer. Accordingly, the retainer is prevented from being attached to the housing in the assembly failure state of the terminal member.

In the above connector, preferably, the terminal member includes: a first sidewall (42) and a second sidewall (44) arranged on both lateral sides; and a first extending piece (76) extending in an arch shape from the first sidewall to the second sidewall and having a free end supported by the second sidewall, and the first extending piece constitutes the protruding portion.

According to this configuration, the buckling strength of the protruding portion that constitutes the locking portion is increased with respect to the insertion direction of the retainer. Accordingly, the retainer is prevented from being attached to the housing in the assembly failure state of the terminal member, thereby reducing the occurrence of defective products.

The above connector, preferably, further comprises a second extending piece (78) extending from the second sidewall to the first sidewall, wherein the first extending piece is supported by the second sidewall via the second extending piece.

According to this configuration, the buckling strength of the protruding portion that constitutes the locking portion is increased with respect to the insertion direction of the retainer. Accordingly, the retainer is prevented from being attached to the housing in the assembly failure state of the terminal member, thereby reducing the occurrence of defective products.

In the above connector, preferably, the second extending piece has a free end (78A) that passes through a cutout portion (76A) provided at a base end of the first extending piece and is supported by the first sidewall.

According to this configuration, the buckling strength of the protruding portion is further increased with respect to the insertion direction of the retainer. Accordingly, the retainer is prevented from being attached to the housing in the assembly failure state of the terminal member.

In the above connector, preferably, the locking portion has a locking end surface (46B) extending in a direction perpendicular to the insertion direction, and the retainer has an inclined end surface (66B) inclined with respect to the insertion direction and configured to abut on the locking end surface.

According to this configuration, the insertion of the retainer to the housing can assist the insertion of the terminal member to the housing.

In the above connector, preferably, the terminal member has an end surface (56A) facing a rear side in the insertion direction, and the housing includes a cantilevered lance piece (58) opposed to the end surface facing the rear side, and the lance piece has a free end (58A) opposed to the end surface opposed to the rear side.

According to this configuration, the lance piece in addition to the retainer locks the terminal member to the housing.

Effect of the Invention

The connector according to the present invention prevents the retainer from being attached to the housing in the assembly failure state of the terminal member, thereby reducing the occurrence of defective products.

BRIEF DESCRIPTION OF THE DRAWINGS

FIG. 14 is a perspective view from above of a terminal member for a connector according to the embodiment 3;

FIG. 20 is a perspective view from above of a terminal member for a connector according to the embodiment 5;

MODE(S) FOR CARRYING OUT THE INVENTION

Embodiment 1

In the following, the embodiment 1 of a connector according to the present invention will be described with reference to FIGS. 1 to 10. Hereinafter, “up (upper)”, “down (lower)”, “left”, “right”, “front”, and “rear” are defined as indicated by the arrows in FIG. 1. However, such definitions of directions are used for convenience of explanation, and the definitions of directions are not limited to this.

Figure 1:
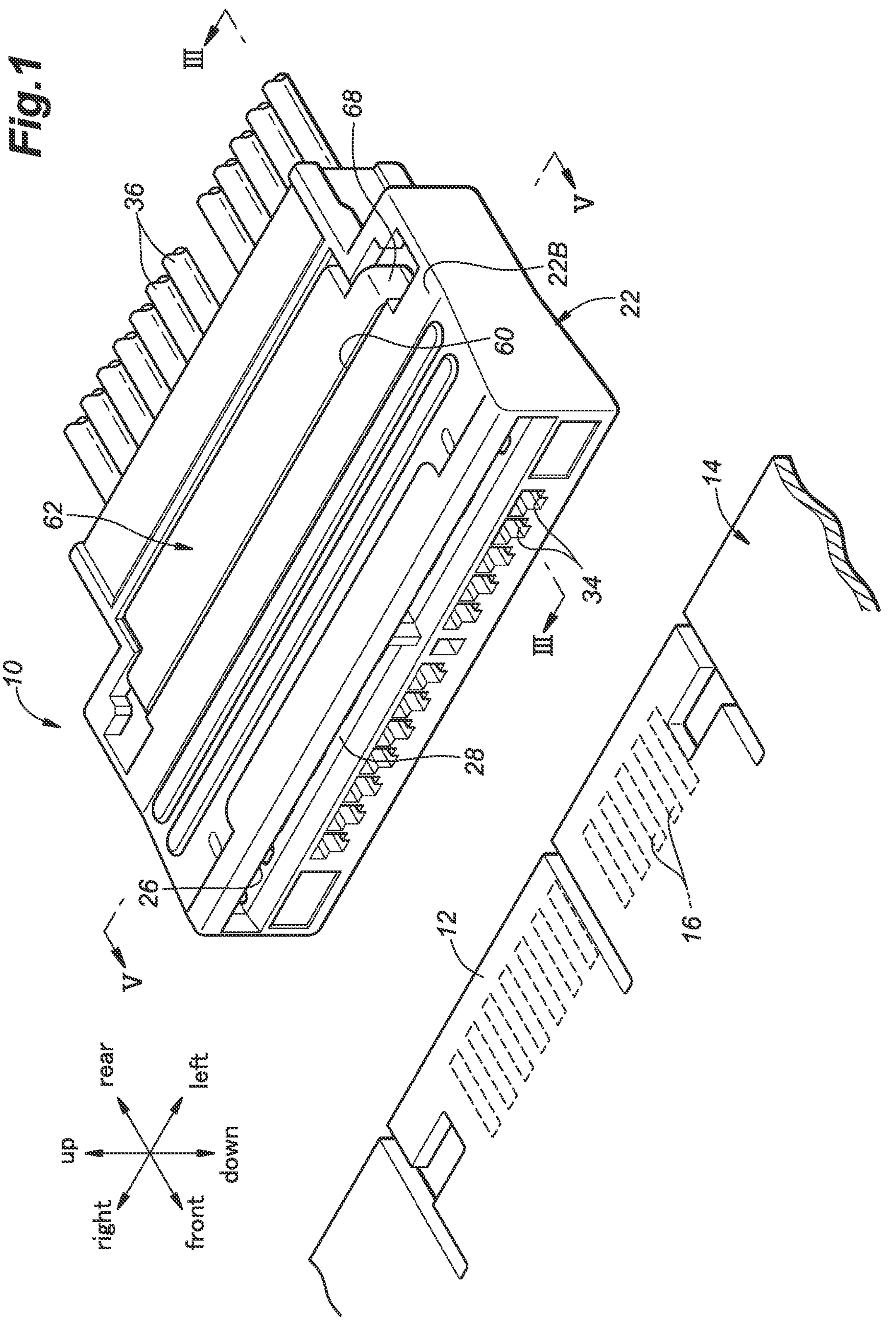
FIG. 1 is a perspective view showing a connector according to the embodiment 1 of the present invention.

As shown in FIG. 1, a connector 10 according to the present embodiment is a card edge connector attached to an edge portion 12 of an electric circuit board 14 (printed circuit board). The connector 10 is used for electrical connection with a plurality of board side terminal portions 16 formed on a bottom surface of the edge portion 12.

As shown in FIGS. 1 to 4, the connector 10 includes an electrically insulated housing 22 made of a resin molding. The housing 22 has a flat shape elongated in the lateral direction. The housing 22 has a card edge inlet chamber 28 extending in the front-and-rear direction from an inlet 26 opening on a front surface of the housing 22. The edge portion 12 (card edge) of the electric circuit board 14 is inserted to the card edge inlet chamber 28 from the inlet 26.

The housing 22 has a plurality of terminal holding chambers 34 spaced in the lateral direction. The plurality of terminal holding chambers 34 extends under the card edge inlet chamber 28 in a prescribed direction, that is, the front-and-rear direction. Each terminal holding chamber 34 penetrates the housing 22 in the front-and-rear direction, and communicates with the card edge inlet chamber 28 on a front side thereof.

Terminal members 38 are arranged in the respective terminal holding chambers 34. Each terminal member 38 is inserted to the corresponding terminal holding chamber 34 from a rear side to a front side of the housing 22 (terminal holding chamber 34) along a prescribed insertion direction A (see FIG. 4). Accordingly, each terminal member 38 is held in the corresponding terminal holding chamber 34.

Figure 3:
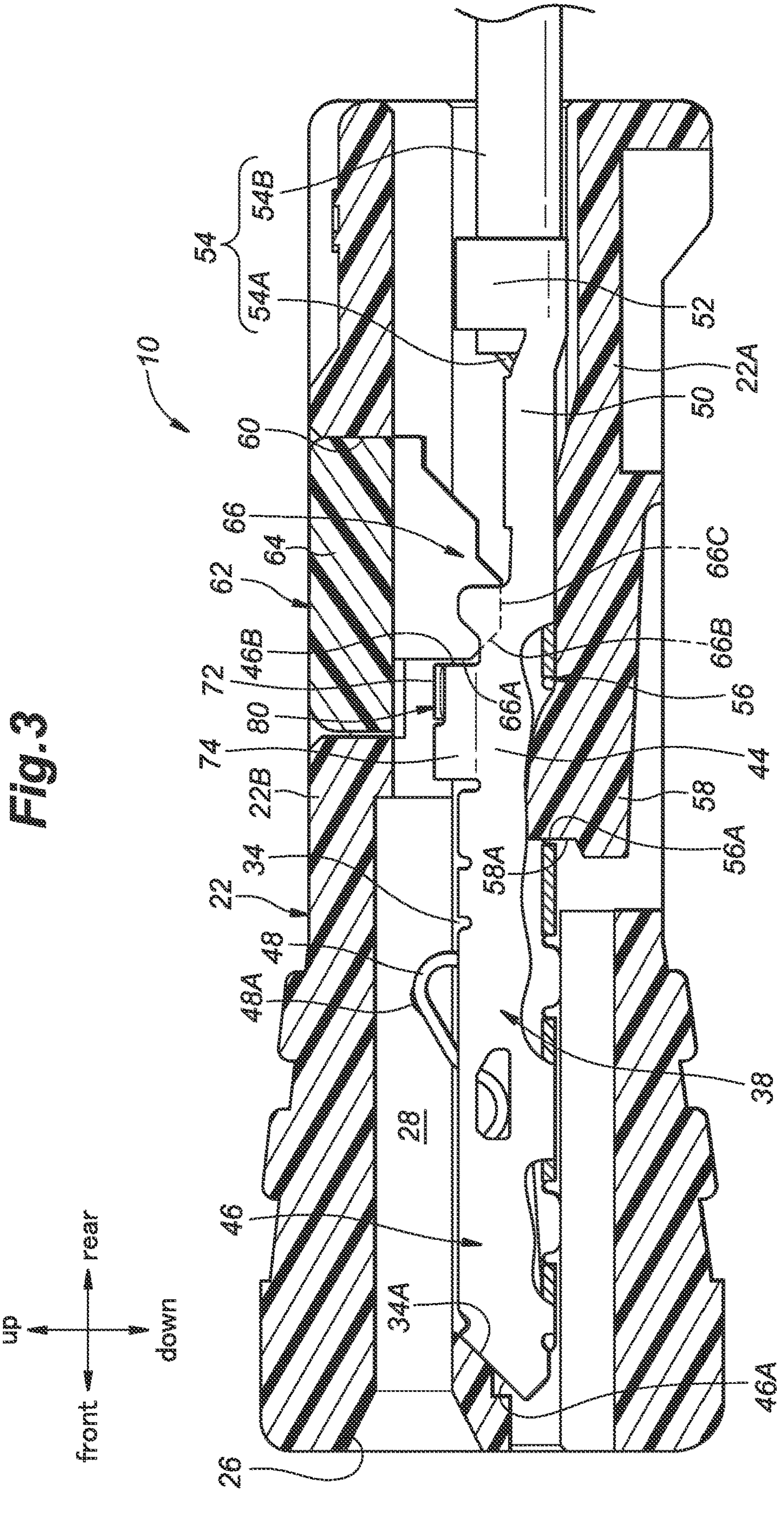
FIG. 3 is a cross-sectional view along a line III-III in FIG. 1.

As shown in FIG. 3, the terminal member 38 is inserted to the terminal holding chamber 34 such that an after-mentioned front end surface 46A of the terminal body 46 abuts on a front end surface 34A formed on the housing 22. The front end surface 46A faces the front side in the insertion direction A. The front end surface 34A faces the rear side in the insertion direction A.

Hereinafter, a position (assembly state) where each terminal member 38 is inserted to the corresponding terminal holding chamber 34 such that the front end surface 46A of the terminal body 46 abuts against or approaches the front end surface 34A of the housing 22 will be referred to as a regular insertion position (regular assembly state).

Each terminal member 38 is a bent article made of a conductive plate material, that is, a pressed material. As shown in FIGS. 2-4 and 7-10, each terminal member 38 includes a terminal body 46 having a recessed cross-section, an elastic (springy) contact piece 48, a core wire barrel 50, and an insulation barrel 52. The terminal body 46 includes a bottom wall 40, and a first sidewall 42 and a second sidewall 44 extending upward from both lateral edges of the bottom wall 40 and arranged on both lateral sides. The contact piece 48 is bent rearward from a front edge of the bottom wall 40 of the terminal body 46. The core wire barrel 50 and the insulation barrel 52 are formed at the rear of the terminal body 46. A core wire 54A of an insulation cable 54 is crimped to the core wire barrel 50, and an insulation portion 54B of the insulation cable 54 is crimped to the insulation barrel 52.

The contact piece 48 of each terminal member 38 includes a portion exposed above the terminal body 46 and configured to enter the card edge inlet chamber 28. On an upper surface of this portion, a contact portion 48A protruding by emboss processing is provided. The contact portion 48A of the contact piece 48 is in conductive contact with the corresponding board side terminal portion 16 of the edge portion 12 of the electric circuit board 14 inserted to the card edge inlet chamber 28.

Figure 8:
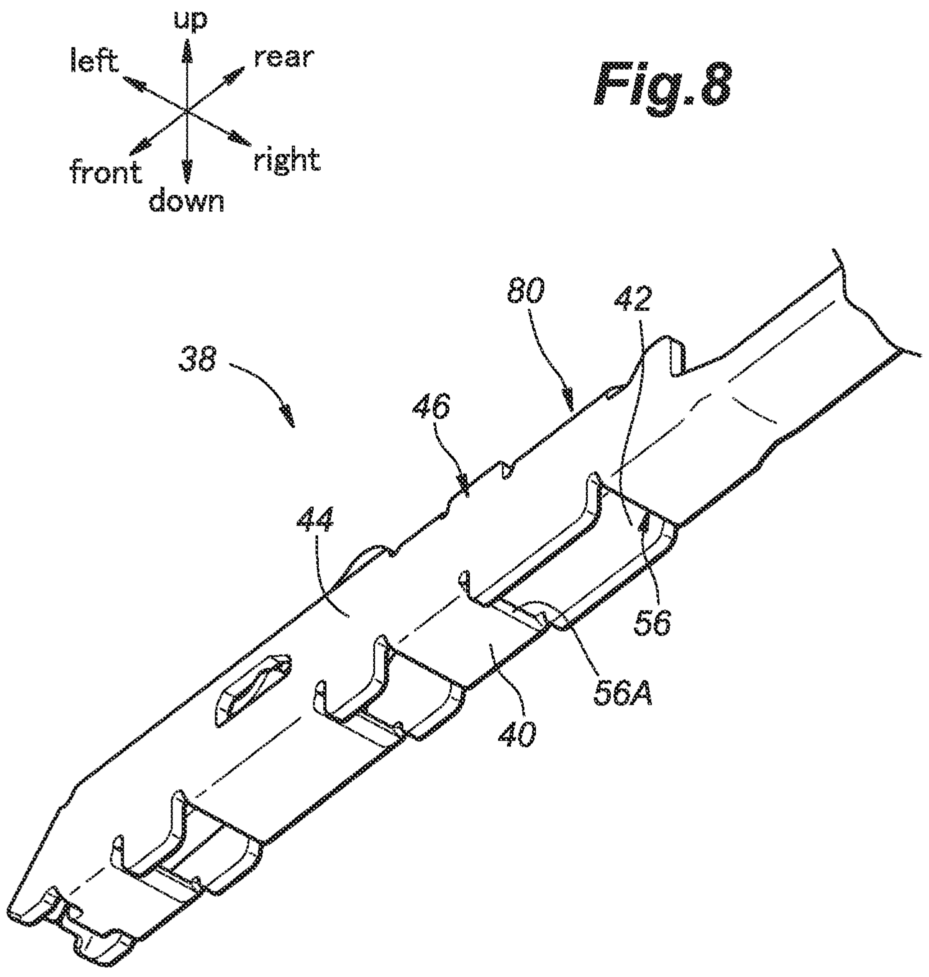
FIG. 8 is a perspective view of the terminal member from below.

As shown in FIGS. 3 and 8, an opening 56 is formed on the bottom wall 40 of each terminal member 38. As shown in FIG. 3, a lower wall 22A of the housing 22 is provided with cantilevered elastic lance pieces 58 corresponding to the respective terminal holding chambers 34. As shown in FIG. 3, as the terminal member 38 is inserted to the terminal holding chamber 34 at the regular insertion position, a free end side of the lance piece 58 enters the opening 56. Accordingly, a substantially vertical front end surface 58A (free end) of the lance piece 58 facing the front side in the insertion direction A is opposed to a substantially vertical opening end surface 56A arranged in a front portion of the opening 56 and facing the rear side in the insertion direction A. Accordingly, the lance piece 58 prevents the terminal member 38 from coming off the terminal holding chamber 34.

Each terminal member 38 is fixed to the housing 22 at the regular insertion position as the front end surface 46A abuts on or approaches the front end surface 34A of the housing 22, and the front end surface 58A of the lance piece 58 abuts on or approaches the opening end surface 56A.

Figure 4:
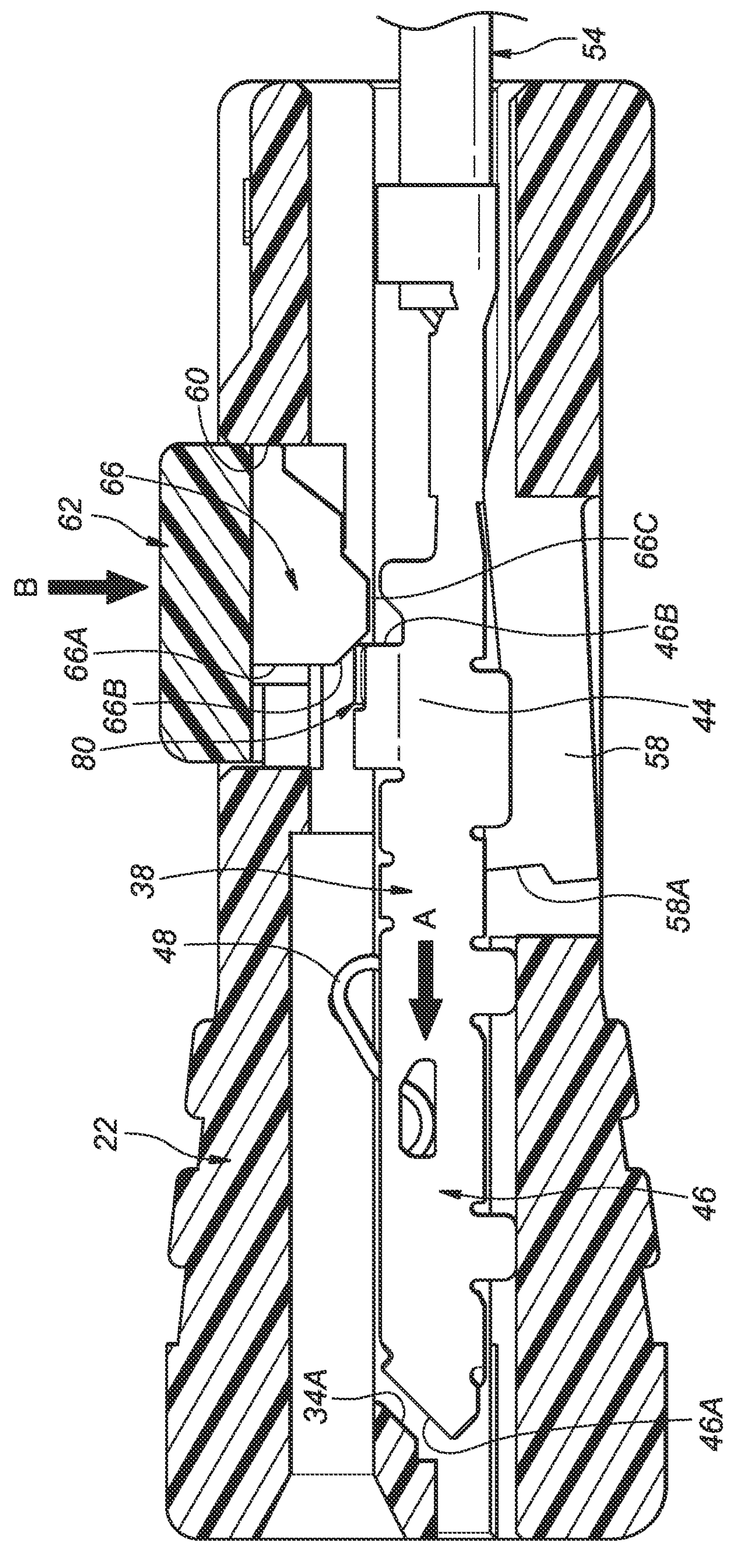
FIG. 4 is a cross-sectional view (that corresponds to a cross-sectional view along a line III-III in FIG. 1) showing an example of an assembly process of a retainer in the connector according to the embodiment 1.

An upper wall 22B of the housing 22 is provided with a retainer insertion opening 60 elongated in the lateral direction and having a substantially rectangular shape in a plan view. The retainer insertion opening 60 penetrates the upper wall 22B in the up-and-down direction, and collectively opens at each terminal holding chamber 34. As shown in FIG. 4, a retainer 62 is inserted to the retainer insertion opening 60 from an upper side to a lower side thereof along an insertion direction B (up-and-down direction) perpendicular to the insertion direction A of the terminal member 38.

Figure 6:
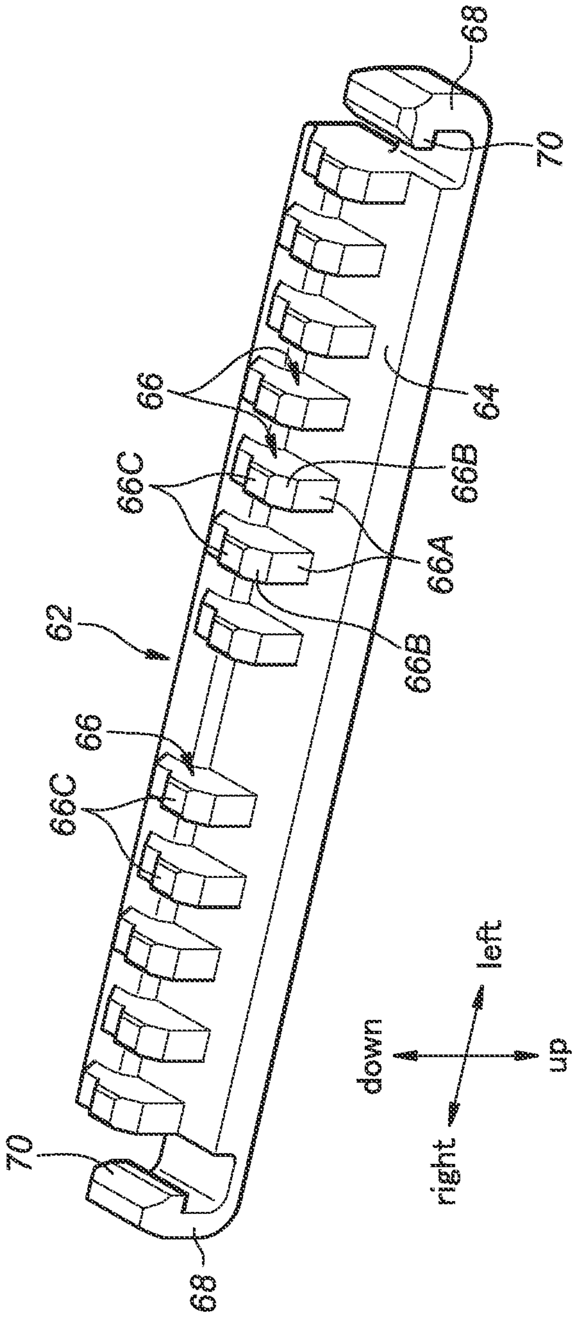
FIG. 6 is an upside-down perspective view of the retainer for the connector according to the embodiment 1.

The retainer 62 is an electrically insulated resin molded article. As shown in FIG. 6, the retainer 62 includes a retainer base portion 64 elongated in the lateral direction and having a substantially rectangular shape in a plan view, and a plurality of protrusions 66 protruding downward from a lower surface of the retainer base portion 64. Each protrusion 66 enters a space between the first sidewall 42 and the second sidewall 44 of the corresponding terminal member 38. Each protrusion 66 has a substantially vertical locking end surface 66A facing the front side and extending in a direction substantially perpendicular to the insertion direction A. As shown in FIG. 3, in a state where the terminal member 38 is at the regular insertion position, the locking end surface 66A abuts on a substantially vertical locking end surface 46B provided on the corresponding terminal member 38, or is opposed to the substantially vertical locking end surface 46B with a small gap. The locking end surface 46B constitutes a locking portion, and faces the rear side in the insertion direction A.

The retainer 62 is inserted to the retainer insertion opening 60 such that each locking end surface 66A abuts on or is opposed to the locking end surface 46B of the corresponding terminal member 38. Accordingly, the retainer 62 as well as the lance piece 58 prevents the terminal member 38 from coming off the housing 22 rearward.

Each protrusion 66 has an inclined end surface 66B inclined rearward with respect to the insertion direction A from a lower end of the locking end surface 66A. As shown in FIG. 4, if the terminal member 38 is inserted to the terminal holding chamber 34 at a position more rearward than the regular insertion position and the locking end surface 46B of the terminal member 38 is arranged more forward than the inclined end surface 66B of the protrusion 66, the inclined end surface 66B abuts on the locking end surface 46B as the retainer 62 is inserted to the retainer insertion opening 60. As the retainer 62 is further inserted to the retainer insertion opening 60, the inclined end surface 66B pushes the locking end surface 46B forward and move the terminal member 38 to the regular insertion position.

Accordingly, the retainer 62 also has a function of moving the terminal member 38 to the regular insertion position. That is, the insertion (mounting) of the retainer 62 to the housing 22 assists the insertion of the terminal member 38 to the housing 22 at the regular insertion position.

Figure 2:
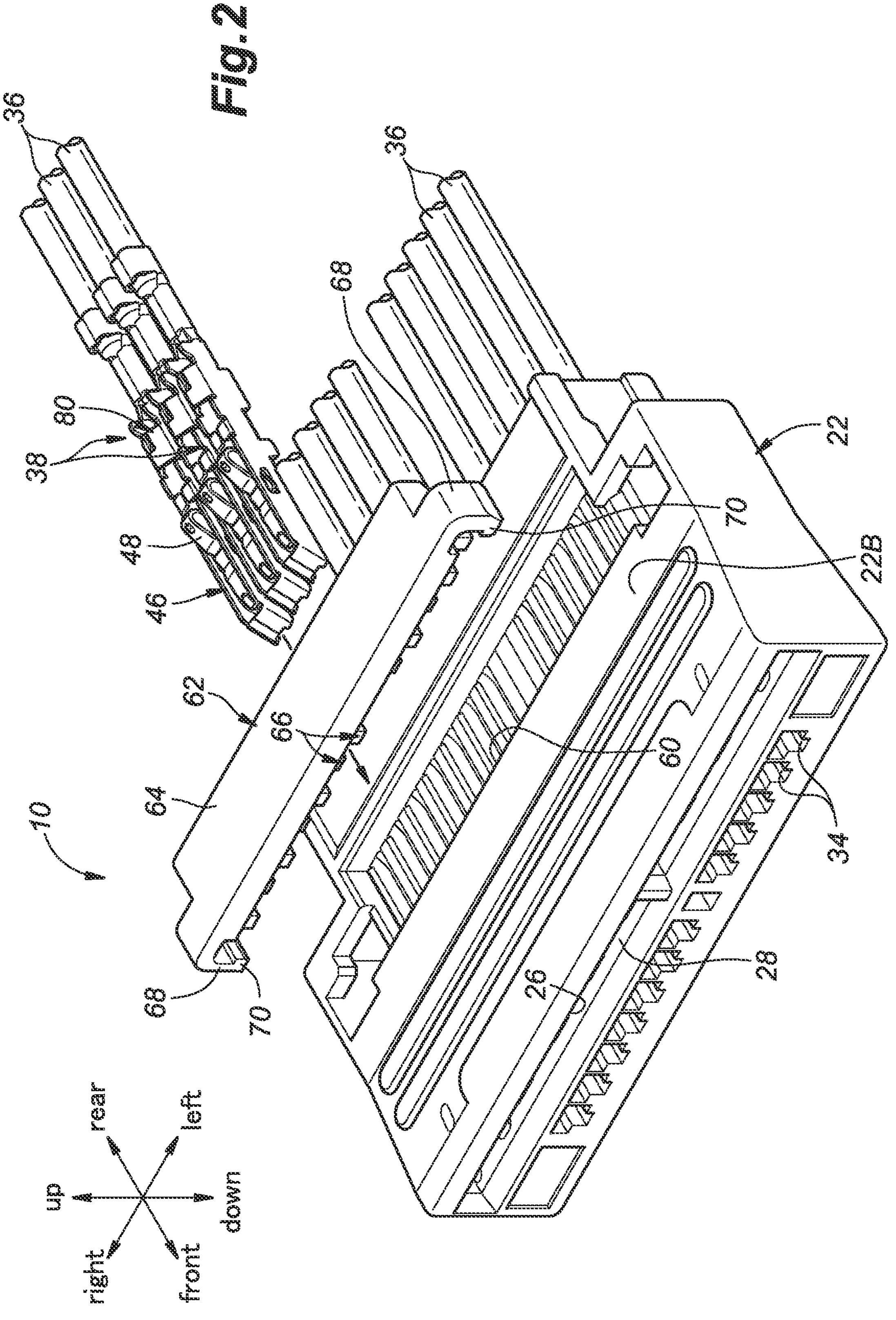
FIG. 2 is an exploded perspective view of the connector according to the embodiment 1.
Figure 5:
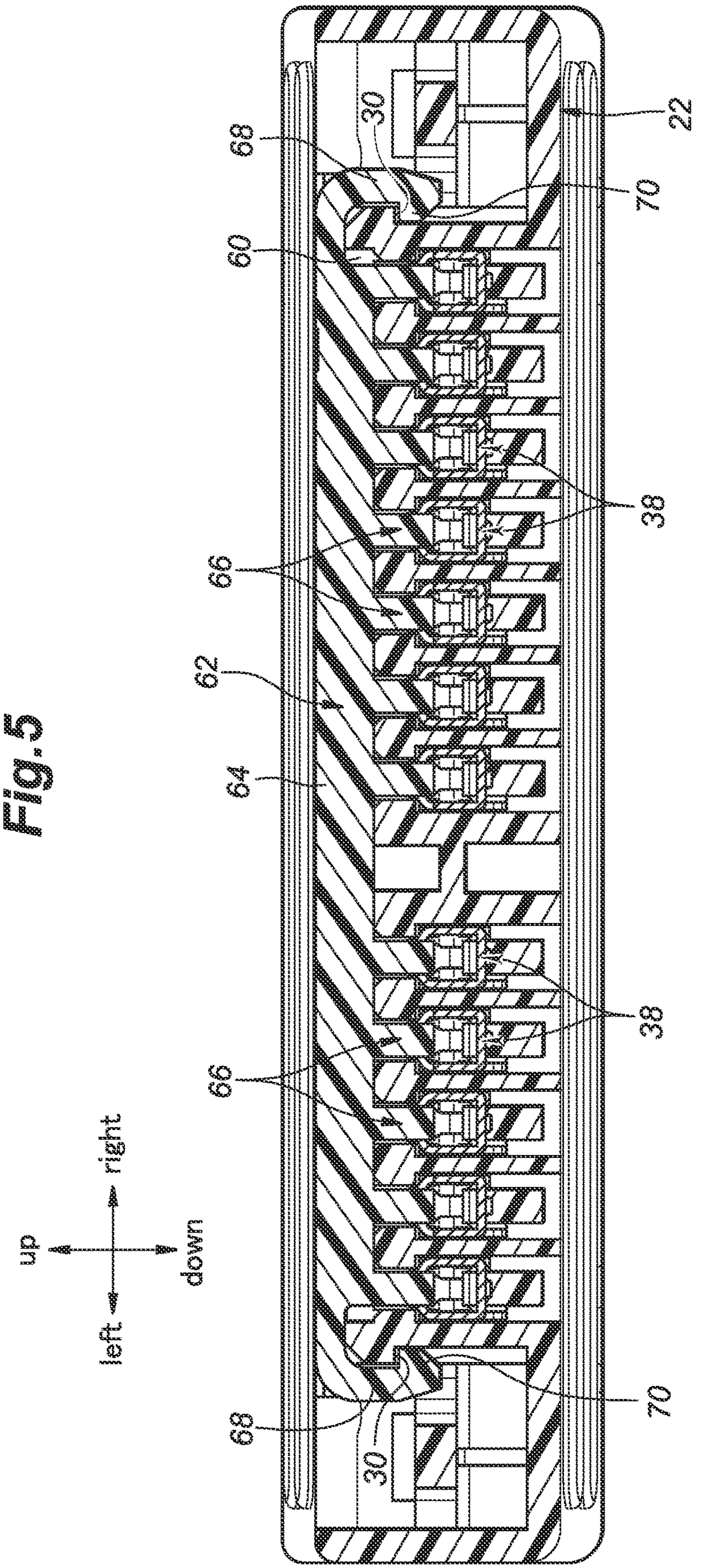
FIG. 5 is a cross-sectional view along a line V-V in FIG. 1.

As shown in FIGS. 2, 5 and 6, the retainer 62 includes locking legs 68 protruding downward from both lateral ends of the retainer base portion 64. Each locking leg 68 includes a locking claw 70 at a free end thereof. The retainer 62 is fixed to the housing 22 as the respective locking claws 70 engage with locking portions 30 formed on both lateral sides of the housing 22.

Figure 7:
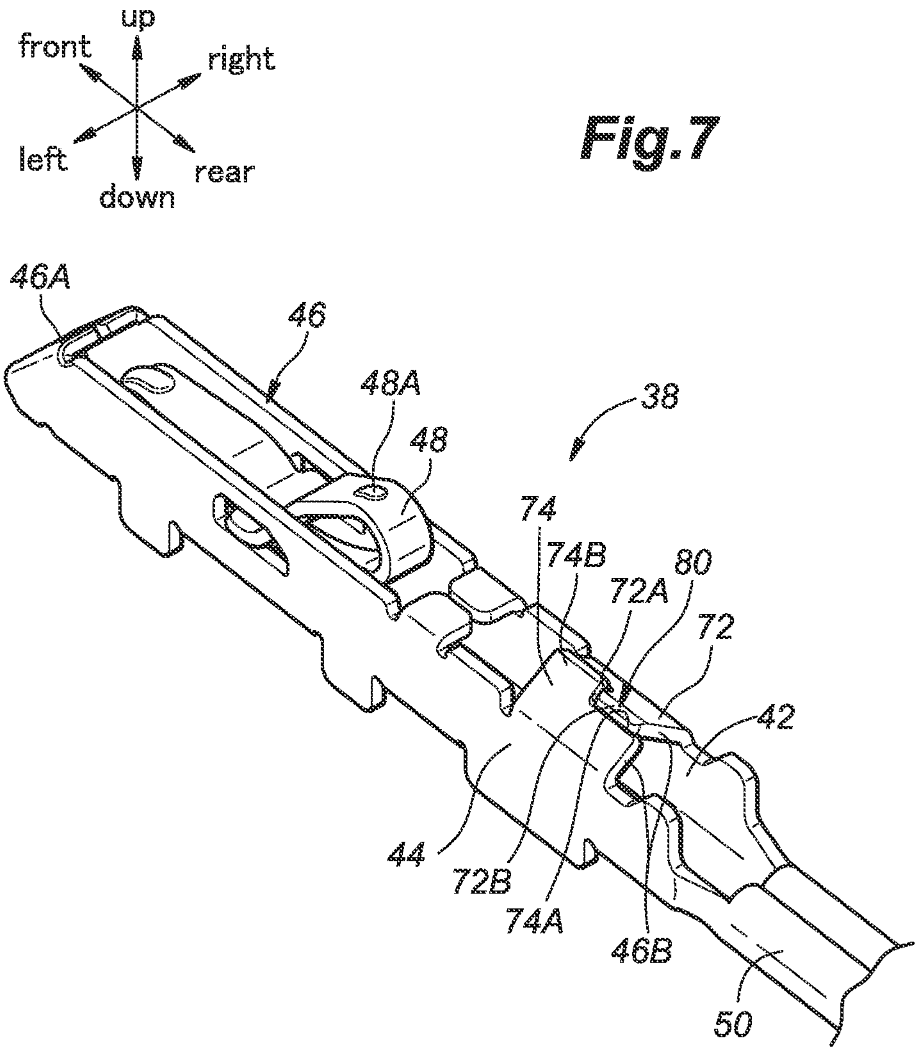
FIG. 7 is a perspective view from above of a terminal member for the connector according to the embodiment 1.
Figure 9:
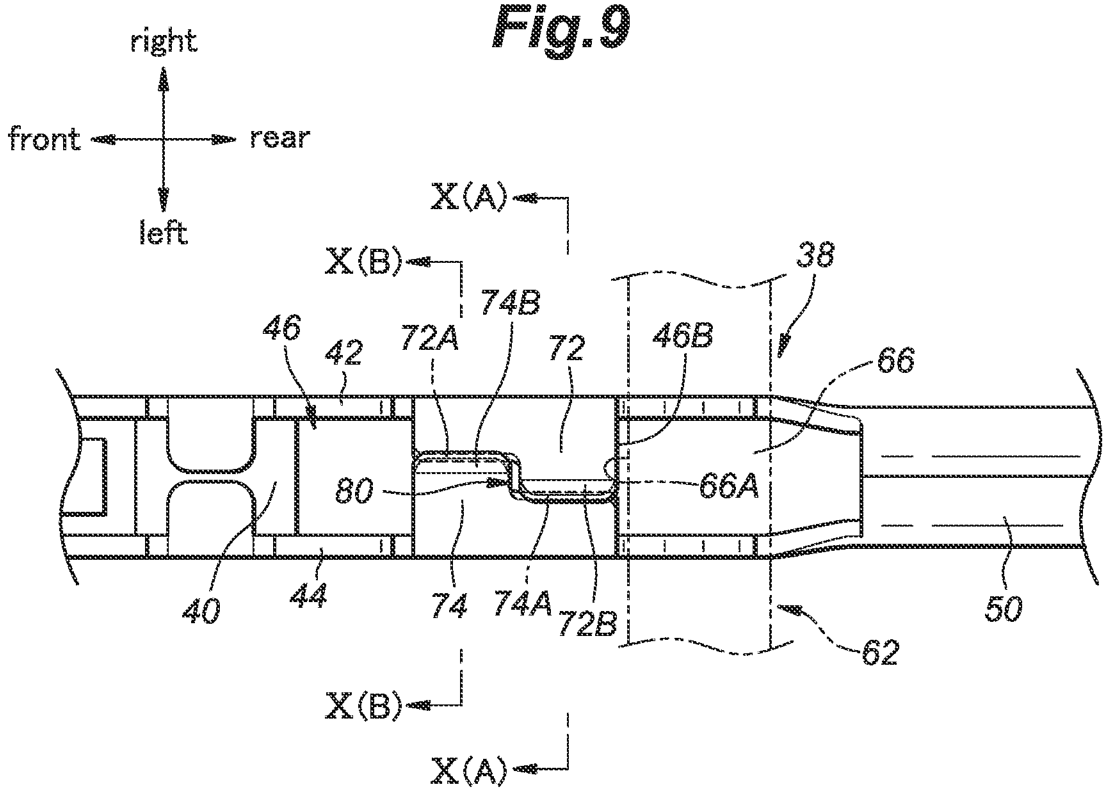
FIG. 9 is a plan view of a main portion of the terminal member.
Figure 10:
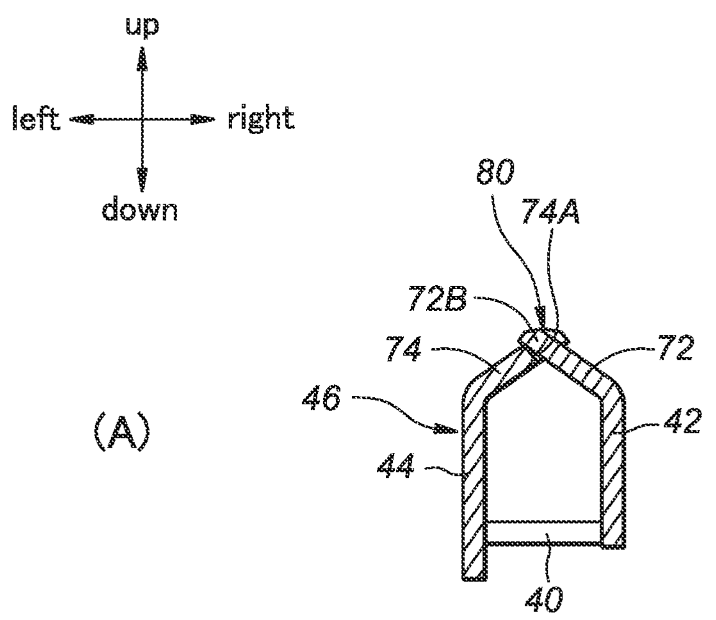
FIG. 10(A) is a cross-sectional view along a line X(A)-X(A) in FIG. 9.
FIG. 10(B) is a cross-sectional view along a line X(B)-X(B) in FIG. 9.
Figure 10:
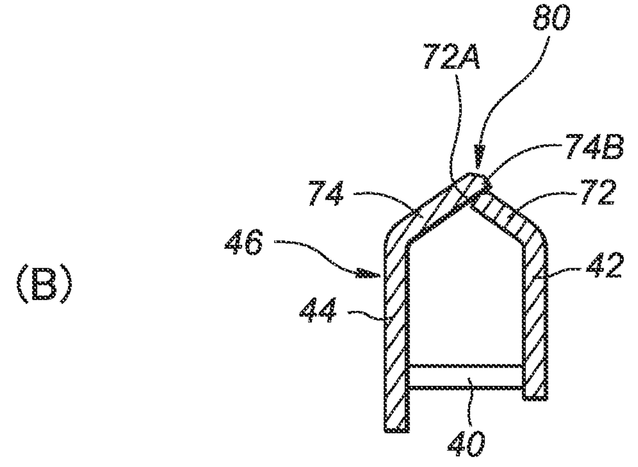

Next, the details of the locking end surface 46B provided on each terminal member 38 will be described with reference to FIGS. 7-9.

The terminal member 38 is a bent article of one plate material. The terminal member 38 includes a first extending piece 72 inclined from an upper edge of the first sidewall 42 of the terminal body 46 to a side of the second sidewall 44, and a second extending piece 74 inclined from an upper edge of the second sidewall 44 to a side of the first sidewall 42. Abutting portions 72B, 74B are provided on free end sides of the first extending piece 72 and the second extending piece 74, respectively. The abutting portions 72B, 74B are offset from each other with respect to the insertion direction A (front-and-rear direction) of the terminal member 38, and support each other. Accordingly, the first extending piece 72 and the second extending piece 74 constitute a V-shaped (arch-shaped) locking end surface 46B. That is, the first extending piece 72 is supported by the second extending piece 74 as the abutting portion 72B of the first extending piece 72 abuts on a cutout end surface 74A of the second extending piece 74, and the second extending piece 74 is supported by the first extending piece 72 as the abutting portion 74B of the second extending piece 74 abuts on a cutout end surface 72A of the first extending piece 72.

In this way, the first extending piece 72 and the second extending piece 74 are offset from each other with respect to the insertion direction A (front-and-rear direction) of the terminal member 38 and support each other, thereby cooperatively constituting a protruding portion 80 having a top portion on one side (upper side) in the insertion direction B of the retainer 62 to the housing 22. In other words, the protruding portion 80 has a substantially vertical locking end surface 46B facing the rear side in the insertion direction A of the retainer 62. The protruding portion 80 has a substantially triangular V-shape, which may be called "triangular arch" or "pointed arch", as viewed in the insertion direction A of the terminal member 38 to the housing 22.

As the retainer 62 abuts on the top portion of the protruding portion 80 and the protruding portion 80 receives a load in the insertion direction B from the retainer 62, the load in the insertion direction B from the retainer 62 is applied dividedly to the first sidewall 42 and the second sidewall 44 on both lateral sides according to the shape of the protruding portion 80. Accordingly, the protruding portion 80 has higher rigidity in the up-and-down direction (the insertion direction B of the retainer 62), in other words, higher buckling strength as compared with a case where the protruding portion 80 has a rectangular cross-sectional shape.

Even in an assembly failure state of the terminal member 38 where the terminal member 38 is not inserted to the terminal holding chamber 34 at the regular insertion position, an assembly process of the retainer 62 to the housing 22 may be performed. In such a case, even if each protrusion 66 of the retainer 62 abuts on the protruding portion 80 of the terminal member 38 and the retainer 62 is strongly pushed in the insertion direction B, the protruding portion 80 is less likely to be buckled as compared with the conventional configuration. Accordingly, the retainer 62 is prevented from being inserted to the housing 22 at a fixed position as the protruding portion 80 interferes with the retainer 62. As shown in FIG. 5, the above fixed position of the retainer 62 to the housing 22 is a position where the retainer 62 is inserted to the retainer insertion opening 60 such that the locking claws 70 of the retainer 62 engage with the locking portions 30 of the housing 22.

According to the above action, the retainer 62 is prevented from being attached to the housing 22 in the assembly failure state of the terminal member 38, thereby reducing the occurrence of defective products including an improperly assembled terminal member 38.

Further, the protruding portion 80 is less likely to be buckled as compared with the conventional configuration. Accordingly, it is possible to avoid a situation where the terminal member 38 is deformed greatly and damaged as being pushed by the retainer 62. Also, when parts are replaced, it is possible to avoid a situation where the terminal member 38 cannot be pulled out of the housing 22 due to the deformation of the terminal member 38.

The locking end surface 46B has a triangular V-shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

Embodiment 2

Figure 11:
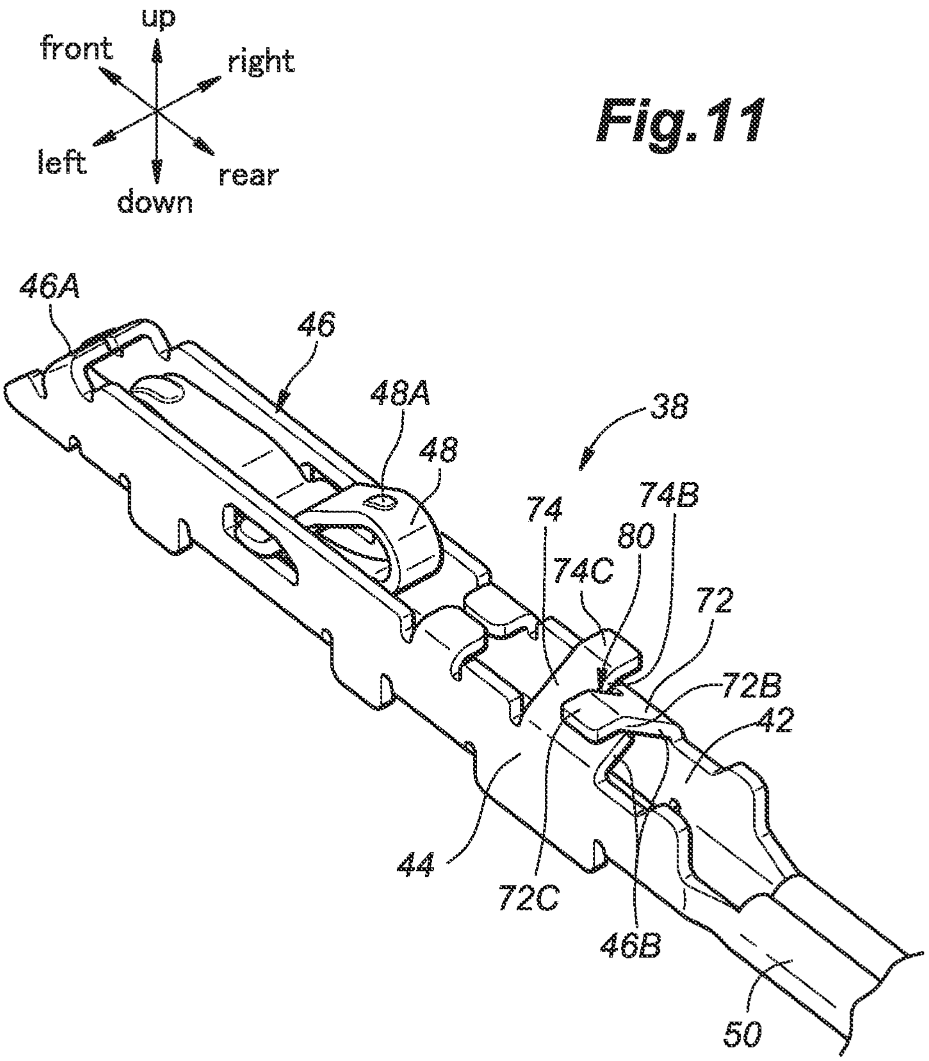
FIG. 11 is a perspective view from above of a terminal member for a connector according to the embodiment 2.
Figure 12:
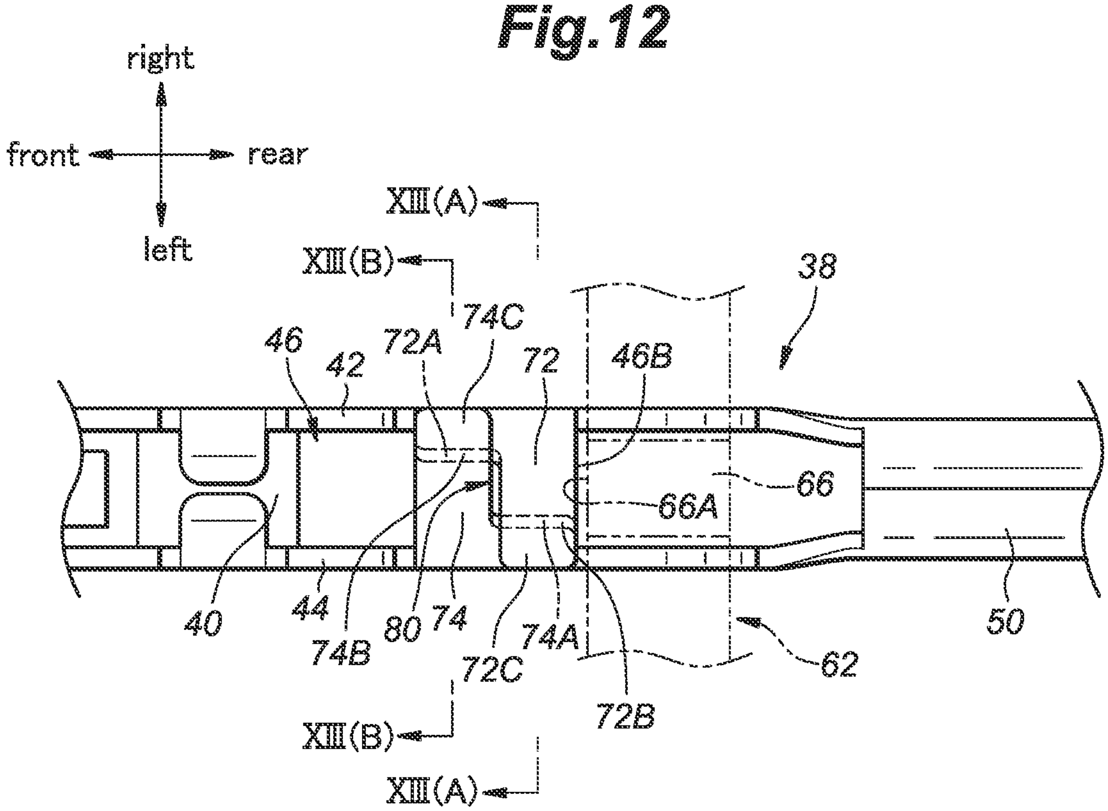
FIG. 12 is a plan view of a main portion of the terminal member.
Figure 13:
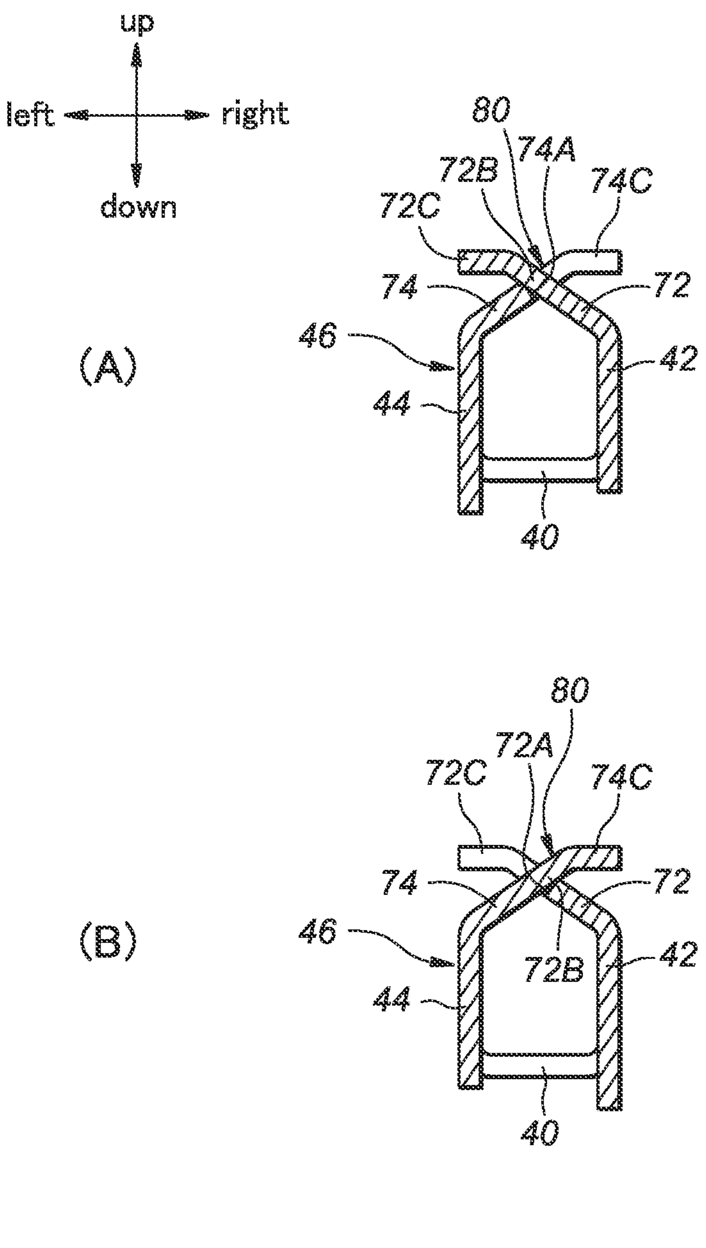
FIG. 13(A) is a cross-sectional view along a line XIII(A)-XIII(A) in FIG. 12.
FIG. 13(B) is a cross-sectional view along a line XIII(B)-XIII(B) in FIG. 12.

Next, the embodiment 2 of the connector according to the present invention will be described with reference to FIGS. 11 to 13. The only difference between the embodiment 1 and the embodiment 2 is the configurations of the protruding portion 80 and the locking end surface 46B provided on each terminal member 38. As such, the descriptions of the other portions corresponding to the portions shown in FIGS. 1 to 6 will be omitted. In FIGS. 11 to 13, the portions corresponding to those in FIGS. 7 to 10 are provided with the same reference numerals as those in FIGS. 7 to 10, and the descriptions thereof will be omitted.

In the embodiment 2, parallel pieces 72C, 74C are provided at free ends of the first extending piece 72 and the second extending piece 74 extending more upward than the abutting portions 72B, 74B. The parallel pieces 72C, 74C are bent so as to extend substantially parallel to the bottom wall 40.

In the embodiment 2, even in the assembly failure state of the terminal member 38 where the terminal member 38 is not inserted to the terminal holding chamber 34 at the regular insertion position, the assembly process of the retainer 62 to the housing 22 may be performed. In such a case, each protrusion 66 of the retainer 62 first abuts on the parallel pieces 72C, 74C of the terminal member 38 and deforms the parallel pieces 72C, 74C, and then abuts on the protruding portion 80.

Accordingly, even if the retainer 62 is strongly pushed in the insertion direction B in the assembly failure state of the terminal member 38, the parallel pieces 72C, 74C are deformed first. Accordingly, the protruding portion 80 is less likely to be buckled.

Accordingly, in the embodiment 2, the retainer 62 is prevented from being attached to the housing 22 in the assembly failure state of the terminal member 38, thereby reducing the occurrence of defective products including an improperly assembled terminal member 38.

Further, the protruding portion 80 is less likely to be buckled as compared with the conventional configuration. Accordingly, it is possible to avoid a situation where the terminal member 38 is deformed greatly and damaged as being pushed by the retainer 62. Also, when parts are replaced, it is possible to avoid a situation where the terminal member 38 cannot be pulled out of the housing 22 due to the deformation of the terminal member 38.

In the embodiment 2, the locking end surface 46B has a triangular V-shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

Embodiment 3

Figure 15:
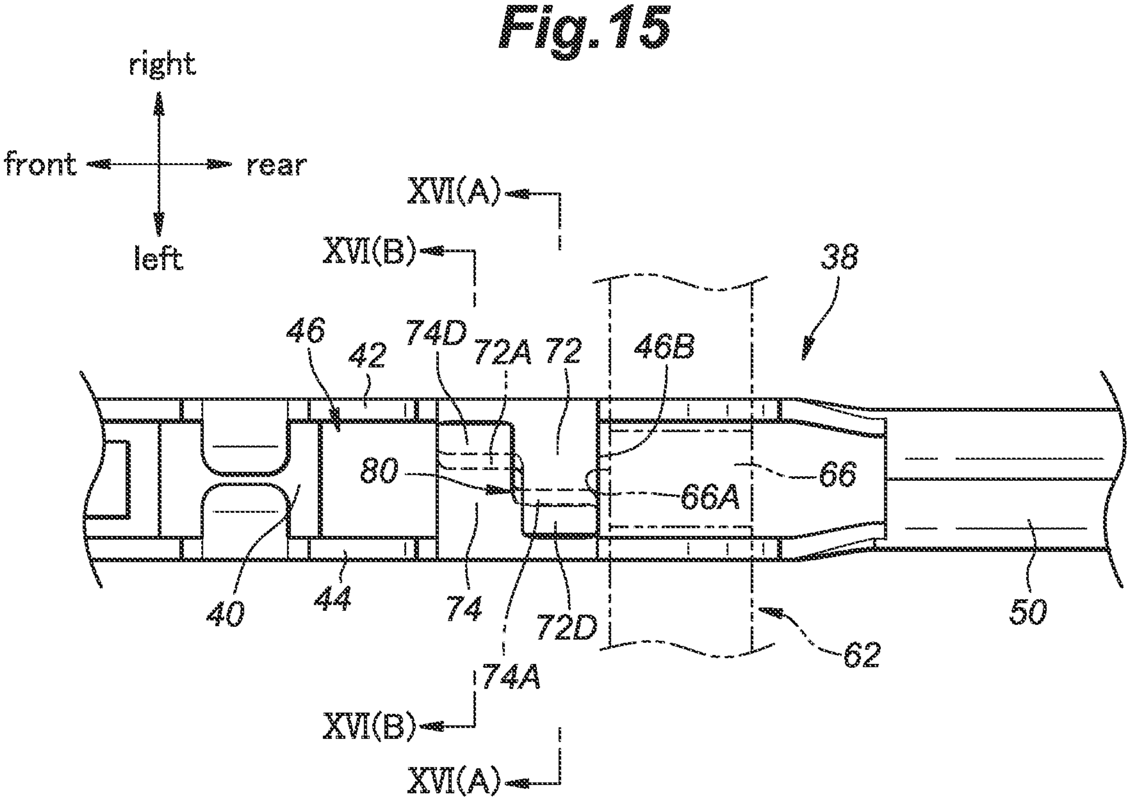
FIG. 15 is a plan view of a main portion of the terminal member.
Figure 16:
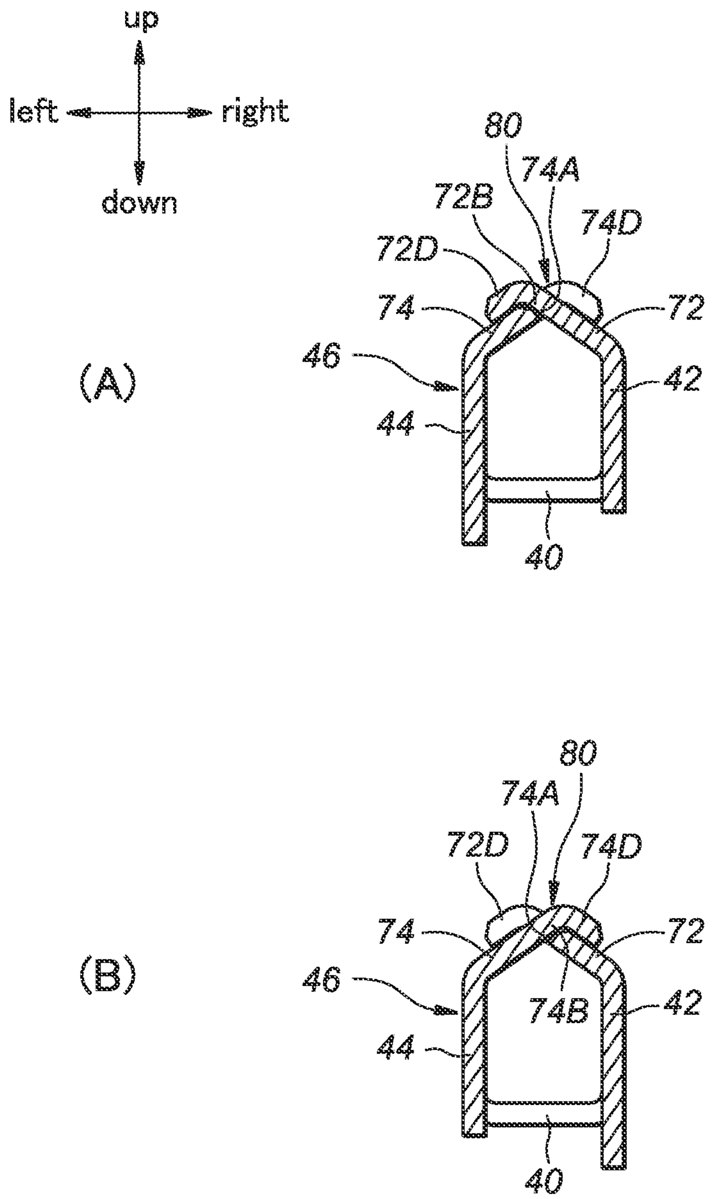
FIG. 16(A) is a cross-sectional view along a line XVI (A)-XVI(A) in FIG. 15.
FIG. 16(B) is a cross-sectional view along a line XVI(B)-XVI(B) in FIG. 15.

Next, the embodiment 3 of the connector according to the present invention will be described with reference to FIGS. 14 to 16. The only difference between the embodiment 1 and the embodiment 3 is the configurations of the protruding portion 80 and the locking end surface 46B provided on each terminal member 38. As such, the descriptions of the other portions corresponding to the portions shown in FIGS. 1 to 6 will be omitted. In FIGS. 14 to 16, the portions corresponding to those in FIGS. 7 to 13 are provided with the same reference numerals as those in FIGS. 7 to 13, and the descriptions thereof will be omitted.

In the embodiment 3, the first extending piece 72 includes an inclined piece 72D. At a free end side of the abutting portion 72B, the inclined piece 72D is bent so as to extend along the second extending piece 74, and overlaps with the second extending piece 74. The second extending piece 74 includes an inclined piece 74D. At a free end side of the abutting portion 74B, the inclined piece 74D is bent so as to extend along the first extending piece 72, and overlaps with the first extending piece 72.

In the embodiment 3, the inclined piece 72D of the first extending piece 72 overlaps with the second extending piece 74, and the inclined piece 74D of the second extending piece 74 overlaps with the first extending piece 72. Accordingly, the buckling strength of the protruding portion 80 is further improved as compared with the embodiment 1.

Accordingly, even if each protrusion 66 of the retainer 62 abuts on the protruding portion 80 of the terminal member 38 and the retainer 62 is strongly pushed in the insertion direction B, the protruding portion 80 is further less likely to be buckled.

According to this action, like the embodiment 1, the retainer 62 is further prevented from being attached to the housing 22 in the assembly failure state of the terminal member 38, thereby further reducing the occurrence of defective products including an improperly assembled terminal member 38.

Further, in the embodiment 3, the protruding portion 80 is less likely to be buckled as compared with the conventional configuration. Accordingly, it is possible to avoid a situation where the terminal member 38 is deformed greatly and damaged as being pushed by the retainer 62. Also, when parts are replaced, it is possible to avoid a situation where the terminal member 38 cannot be pulled out of the housing 22 due to the deformation of the terminal member 38.

In the embodiment 3, the locking end surface 46B has a triangular V-shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

Embodiment 4

Figure 17:
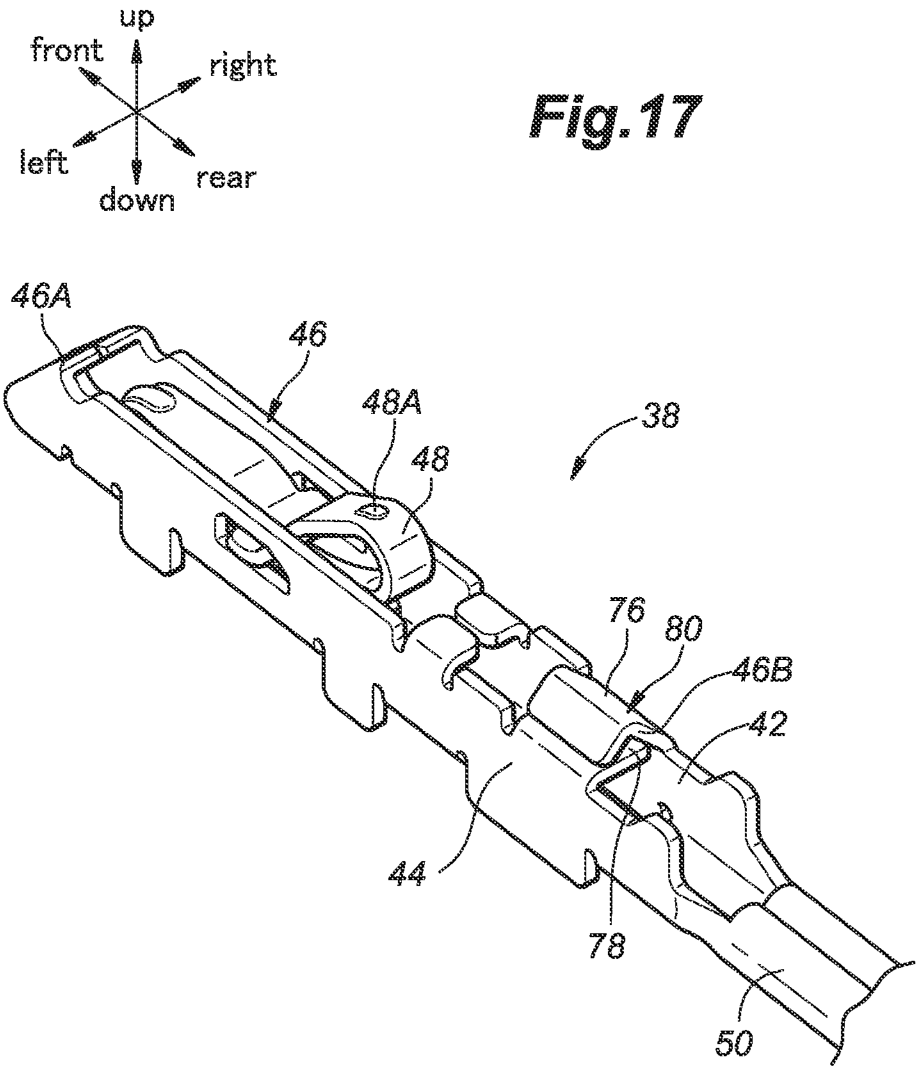
FIG. 17 is a perspective view from above of a terminal member for a connector according to the embodiment 4.
Figure 18:
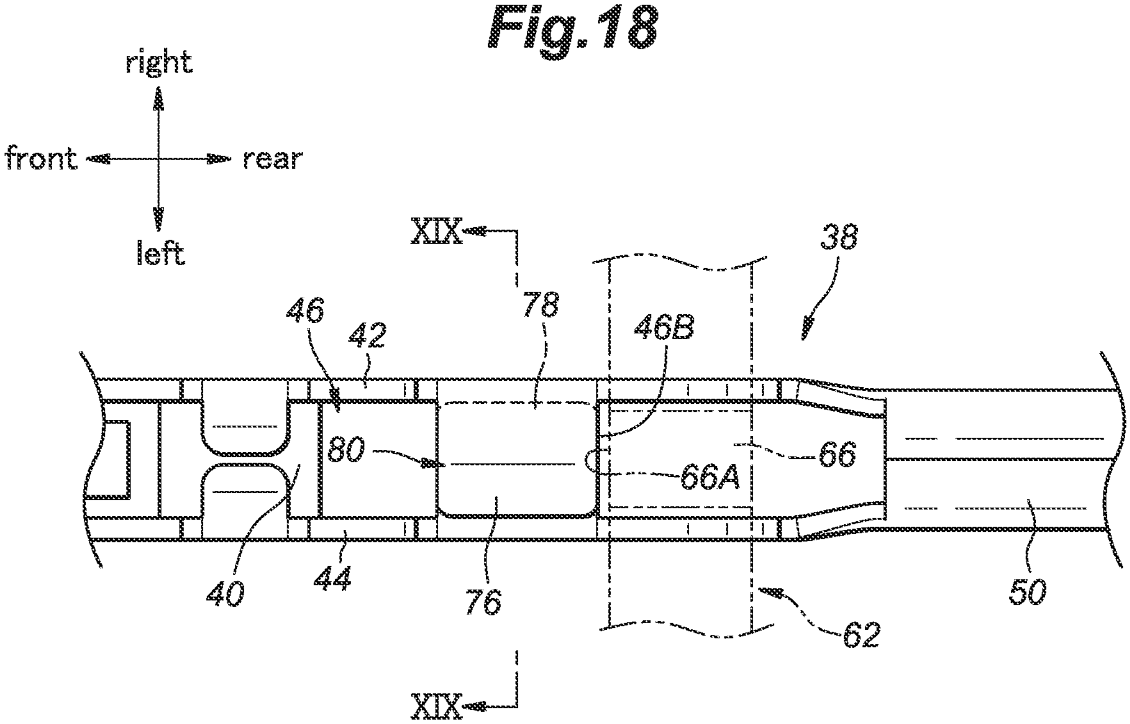
FIG. 18 is a plan view of a main portion of the terminal member.
Figure 19:
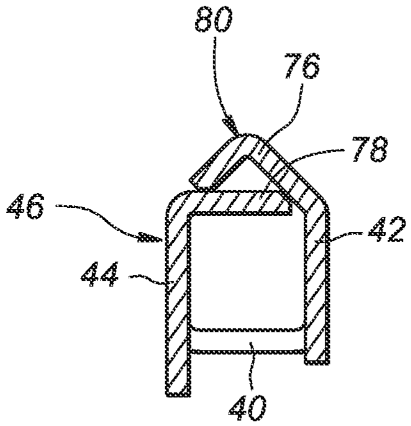
FIG. 19 is a cross-sectional view along a line XIX-XIX in FIG. 18.

Next, the embodiment 4 of the connector according to the present invention will be described with reference to FIGS. 17 to 19. The only difference between the embodiment 1 and the embodiment 4 is the configurations of the protruding portion 80 and the locking end surface 46B provided on each terminal member 38. As such, the descriptions of the other portions corresponding to the portions shown in FIGS. 1 to 6 will be omitted. In FIGS. 17 to 19, the portions corresponding to those in FIGS. 7 to 10 are provided with the same reference numerals as those in FIGS. 7 to 10, and the descriptions thereof will be omitted.

In the embodiment 4, the terminal member 38 includes a first extending piece 76 extending like a V-shaped arch from an upper edge of the first sidewall 42 of the terminal body 46 toward the second sidewall 44. The first extending piece 76 constitutes the protruding portion 80. The protruding portion 80 has a top portion on one side (upper side) in the insertion direction B of the retainer 62 to the housing 22, like the embodiment 1. The protruding portion 80 constitutes a substantially vertical locking end surface 46B facing the rear side in the insertion direction A of the terminal member 38.

The terminal member 38 further includes a second extending piece 78 extending parallel to the bottom wall 40 from an upper edge of the second sidewall 44 of the terminal body 46 to the first sidewall 42.

A free end of the first extending piece 76 overlaps with a vicinity of a base end of the second extending piece 78 in the up-and-down direction. Accordingly, the first extending piece 76 is supported by the second sidewall 44 via the second extending piece 78.

Accordingly, as the retainer 62 abuts on the top portion of the protruding portion 80 and the protruding portion 80 receives a load in the insertion direction B from the retainer 62, the load in the insertion direction B from the retainer 62 is applied dividedly to the first sidewall 42 and the second sidewall 44 on both lateral sides. Accordingly, the protruding portion 80 has higher rigidity in the up-and-down direction (the insertion direction B of the retainer 62), in other words, higher buckling strength as compared with a case where the protruding portion 80 has a rectangular cross-sectional shape.

Accordingly, even if each protrusion 66 of the retainer 62 abuts on the protruding portion 80 of the terminal member 38 and the retainer 62 is strongly pushed in the insertion direction B, the protruding portion 80 is less likely to be buckled.

According to this action, like the embodiment 1, the retainer 62 is prevented from being attached to the housing 22 in the assembly failure state of the terminal member 38, thereby reducing the occurrence of defective products including an improperly assembled terminal member 38.

Further, in the embodiment 4, the protruding portion 80 is less likely to be buckled as compared with the conventional configuration. Accordingly, it is possible to avoid a situation where the terminal member 38 is deformed greatly and damaged as being pushed by the retainer 62. Also, when parts are replaced, it is possible to avoid a situation where the terminal member 38 cannot be pulled out of the housing 22 due to the deformation of the terminal member 38.

The locking end surface 46B has a triangular shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

Embodiment 5

Next, the embodiment 5 of the connector according to the present invention will be described with reference to FIGS.

Figure 21:
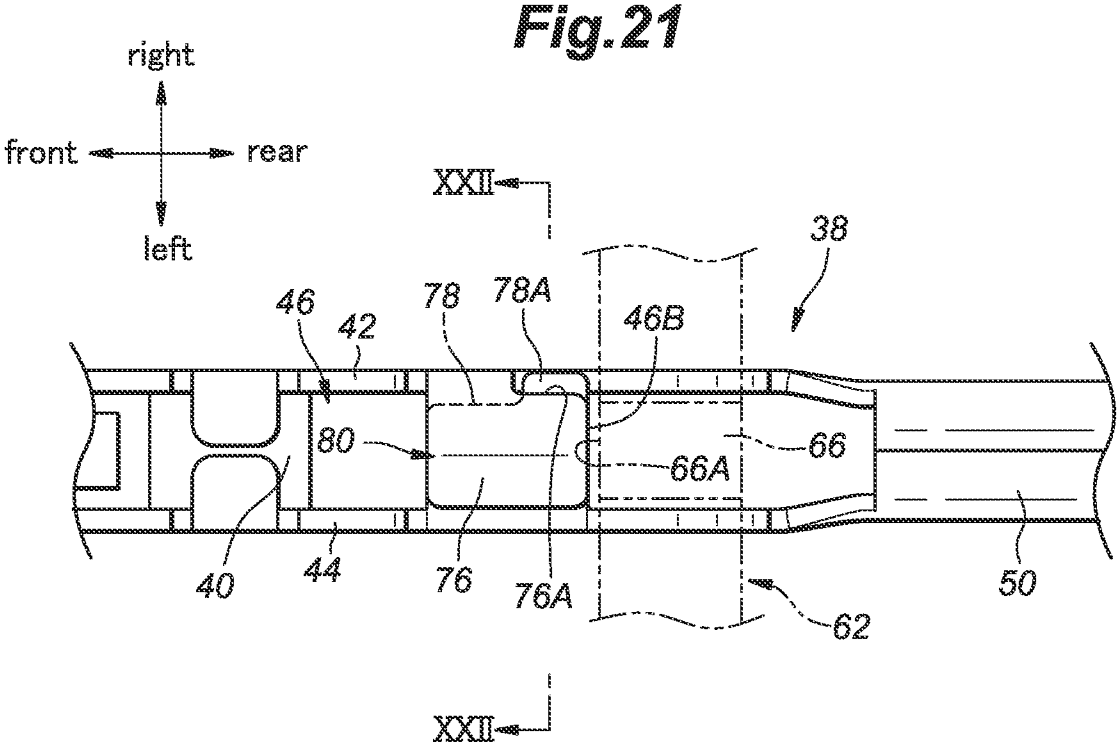
FIG. 21 is a plan view of a main portion of the terminal member.
Figure 22:
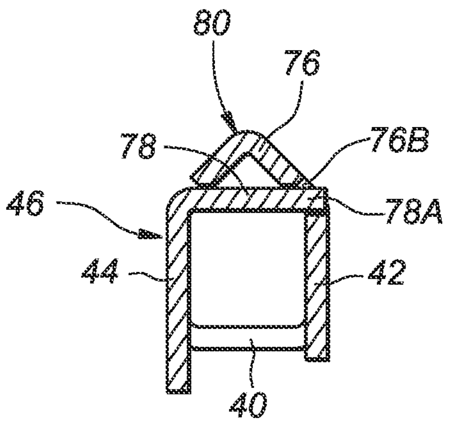
FIG. 22 is a cross-sectional view along a line XXII-XXII in FIG. 21.

20 to 22. The only difference between the embodiment 1 and the embodiment 5 is the configurations of the protruding portion 80 and the locking end surface 46B provided on each terminal member 38. As such, the descriptions of the other portions corresponding to the portions shown in FIGS. 1 to 6 will be omitted. In FIGS. 20 to 22, the portions corresponding to those in FIGS. 17 to 19 are provided with the same reference numerals as those in FIGS. 17 to 19, and the descriptions thereof will be omitted.

In the embodiment 5, the second extending piece 78 includes a free end 78A that passes through a cutout portion 76A provided at a base end of the first extending piece 76 and is directly supported by the first sidewall 42.

In the embodiment 5, the free end 78A of the second extending piece 78 that constitutes the protruding portion 80 is directly supported by the first sidewall 42. Accordingly, the buckling strength of the protruding portion 80 is further improved as compared with the embodiment 4.

Accordingly, even if each protrusion 66 of the retainer 62 abuts on the protruding portion 80 of the terminal member 38 and the retainer 62 is strongly pushed in the insertion direction B, the protruding portion 80 is further less likely to be buckled.

According to this action, like the embodiment 1, the retainer 62 is further prevented from being attached to the housing 22 in the assembly failure state of the terminal member 38, thereby further reducing the occurrence of defective products including an improperly assembled terminal member 38.

Further, in the embodiment 5, the protruding portion 80 is less likely to be buckled as compared with the conventional configuration. Accordingly, it is possible to avoid a situation where the terminal member 38 is deformed greatly and damaged as being pushed by the retainer 62. Also, when parts are replaced, it is possible to avoid a situation where the terminal member 38 cannot be pulled out of the housing 22 due to the deformation of the terminal member 38.

In the embodiment 5, the locking end surface 46B has a triangular shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

In the embodiment 5, the locking end surface 46B has a triangular V-shape that corresponds to an end surface shape of the protruding portion 80. Accordingly, the contact area of the locking end surface 46B and the locking end surface 66A of the retainer 62 increases as compared with a case where the locking end surface 46B has a simple linear shape. Accordingly, it is possible to increase the force for locking the terminal member 38 to the housing 22 by the retainer 62, and thereby effectively prevent the terminal member 38 from coming off the housing 22.

Preferable embodiments of the present invention have been described in the foregoing. However, as easily understood by a skilled person, the present invention should not be limited by the foregoing embodiments, and various modifications and alterations are possible within the scope of the present invention.

For example, the shape of the protruding portion 80 is not limited to a triangular V-shape (triangular arch shape) as viewed in the insertion direction A of the terminal member 38 to the housing 22, but may be a curved arch shape or the like.

The connector according to the present invention is not limited to the connector 10 connected to the edge portion 12 of the electric circuit board 14, but may be various types of connectors, which may be called "plugs" or "jacks", including a retainer equivalent to the retainer 62 of the above-described embodiments.

Also, not all components shown in the foregoing embodiments are necessarily indispensable, and they may be selectively used as appropriate within the scope of the present invention.

GLOSSARY OF TERMS

10: connector
12: edge portion
14: electric circuit board
16: board side terminal portion
22: housing
22A: lower wall
22B: upper wall
26: inlet
28: card edge inlet chamber
30: locking portion
34: terminal holding chamber
34A: front end surface
38: terminal member
40: bottom wall
42: first sidewall
44: second sidewall
46: terminal body
46A: front end surface
46B: locking end surface
48: contact piece
48A: contact portion
50: core wire barrel
52: insulation barrel
54: insulation cable
54A: core wire
54B: insulation portion
56: opening
56A: opening end surface
58: lance piece
58A: front end surface
60: retainer insertion opening
62: retainer
64: retainer base portion
66: protrusion
66A: locking end surface
66B: inclined end surface
68: locking leg
70: locking claw
72: first extending piece
72A: cutout end surface
72B: abutting portion
72C: parallel piece
72D: inclined piece
74: second extending piece
74A: cutout end surface
74B: abutting portion
74C: parallel piece
74D: inclined piece
76: first extending piece
76A: cutout portion
78: second extending piece

78A: free end

80: protruding portion

The invention claimed is:

1. A connector, comprising:

a housing defining a terminal holding chamber extending in a prescribed direction;

a terminal member inserted to the terminal holding chamber along a prescribed insertion direction; and a retainer attached to the housing by being inserted to the housing along a direction perpendicular to the insertion direction so as to engage with a locking portion of the terminal member and thereby prevent the terminal member from coming off, wherein the terminal member includes a protruding portion having a top portion on one side in the direction along which the retainer is inserted to the housing, and the protruding portion has an end surface facing in an opposite direction of the insertion direction of the terminal member and constituting the locking portion, wherein the terminal member is a bent article made of a plate material, wherein the terminal member includes:

a first sidewall and a second sidewall arranged on both lateral sides;

a first extending piece inclined from the first sidewall to the second sidewall; and a second extending piece inclined from the second sidewall to the first sidewall, and free end sides of the first extending piece and the second extending piece are offset from each other with respect to the insertion direction of the terminal member and support each other, and thereby the first extending piece and the second extending piece constitute the protruding portion.

2. The connector according to claim 1, wherein the free end side of the first extending piece is bent so as to extend along the second extending piece, and overlaps with the second extending piece, and the free end side of the second extending piece is bent so as to extend along the first extending piece, and overlaps with the first extending piece.

3. The connector according to claim 1, wherein the locking portion has a locking end surface extending in a direction perpendicular to the insertion direction, and the retainer has an inclined end surface inclined with respect to the insertion direction and configured to abut on the locking end surface.

* * * * *